March 22, 1927. 1,621,623
R. J. BURNS
EXPANSION STEAM TRAP
Filed July 18, 1925
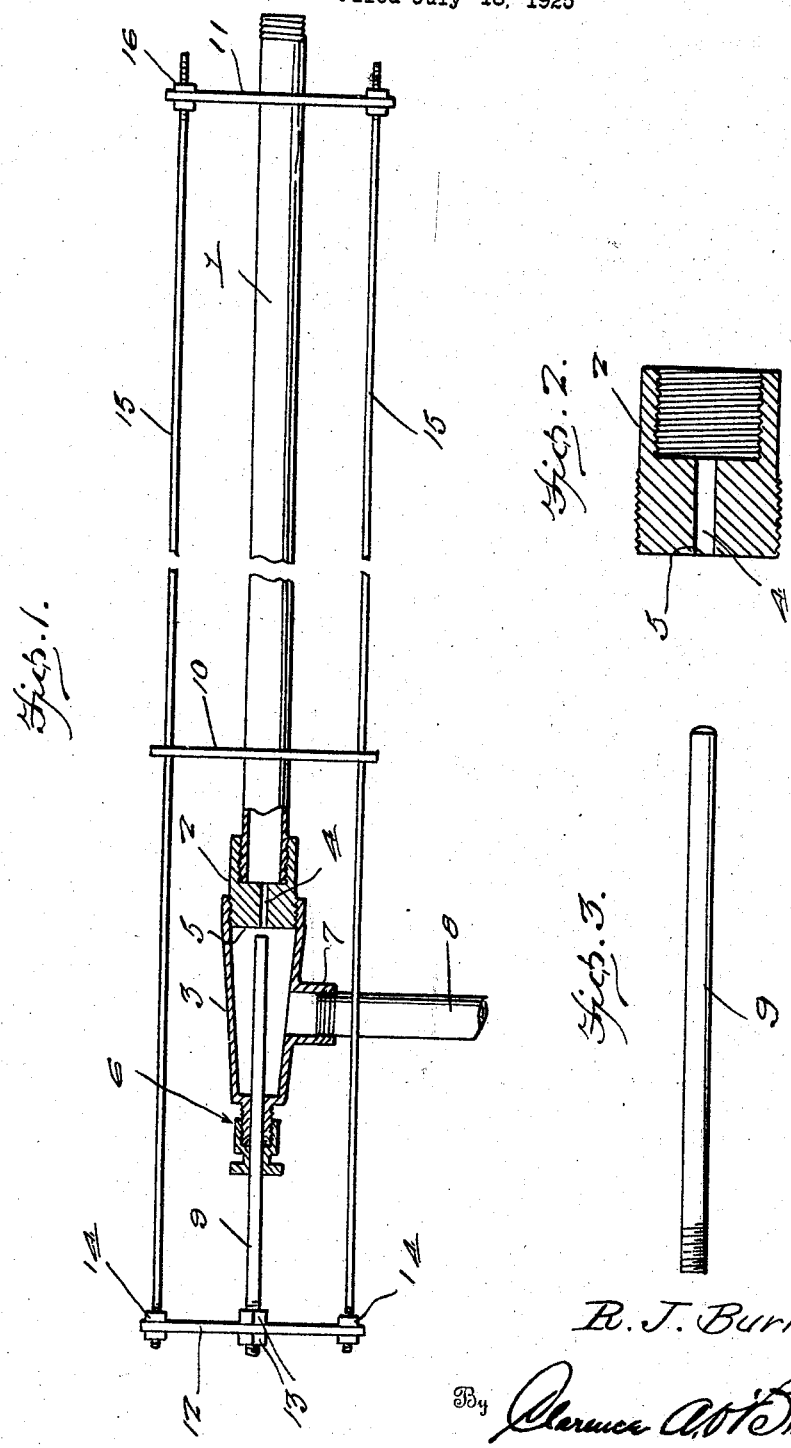
Inventor
R. J. Burns
By Clarence A. O'Brien
Attorney Patented Mar. 22, 1927.

1,621,623

UNITED STATES PATENT OFFICE.

RICHARD J. BURNS, OF LOWELLVILLE, OHIO.

EXPANSION STEAM TRAP.

Application filed July 18, 1925. Serial No. 44,491.

This invention relates to what may be conveniently and broadly referred to as an expansion steam trap of the type wherein a control valve is closed to trap the steam until the latter condenses into a fluid sufficiently cool, at which time the relatively cool fluid is discharged.

The invention has more specific reference to an expansion steam trap of this type wherein the valve is automatically opened and closed according to the expansion and contraction of the pipe, the valve being closed when the pipe is filled with steam, and being automatically opened when the steam condenses to a fluid and the fluid becomes sufficiently cool.

The particular details and their relative arrangement, forming an advantageous and practical structure, will become apparent from the following description and drawings.

In the accompanying drawings forming a part of this application and in which like numerals are employed to designate like parts throughout the same:—

Figure 1 is a view in section and elevation showing a device constructed in accordance with the present invention, and illustrating the valve in particular.

Fig. 2 is a detail view of a coupling forming a part of the invention.

Fig. 3 is an enlarged detail view of the valve rod.

Referring to the drawings in detail, the reference character 1 designates a pipe through which the steam is adapted to pass in a direction from right to left. The pipe is screw threaded at its opposite ends and at its left-hand end is tapped into a counter-bored screw threaded socket in a coupling 2. The coupling in turn is externally screw threaded and is screwed into one end of a somewhat tapered casing 3. It will be noted that the coupling is provided with a restricted bore forming a passage for the steam, the bore being represented by the reference character 4. The reference character 5 designates what may be said to be a valve seat. At one end of the casing is an appropriate stuffing box 6 and intermediate the ends is a right angular nipple 7 with which a discharge pipe 8 is connected. Slidably mounted in the stuffing box and extending into the interior of the casing is a valve rod 9. It will be noted that this rod extends beyond the stuffing box and that the internal portion within the casing 3 is such that the inner end of the rod serves as a valve for cooperation with the adjacent end of the aforesaid bore.

Novel means is employed for imparting sliding movement to the valve rod for moving it toward and from the seat 5. The means preferably comprises a pair of collars or plates 10 and 11 fixedly connected with the pipe 1 at longitudinally spaced points. A cross head 12 is connected to the outer threaded end of the valve rod 9, preferably by means of adjusting nuts 13. Connected to the outer ends of this cross head by the adjusting means shown at 14 is a pair of rods 15. These rods extend slidably through guide openings in the plate 10 and are adjustably connected as at 16 to the plates 11.

From the foregoing it is clear that when the metal part 1 becomes heated to an undue degree by excessive steam, it expands lengthwise, thus exerting a pull upon the rods 15. These rods in turn exert a pull upon the valve rod 9 through the medium of the cross head 12, thus moving the inner end of the valve rod toward the seat 5 and closing the passage. So long as the pipe is filled with steam of a relatively high temperature, the valve remains closed, but as soon as the steam condenses into a cool fluid, the latter acts to contract the pipe and to thereby open the valve so as to allow the condensed fluid to discharge from the trap.

Having thus described my invention, what I claim as new is:—

In a structure of the class described, a relatively long expansible and contractible steam pipe, a casing at the discharge end of said pipe, a coupling between the pipe and casing, said coupling being provided with a restricted passage and a valve seat and being threaded on the pipe and in the casing, a stuffing box carried by the end of said casing remote from the coupling, a valve rod slidable through said stuffing box, the inner end of said valve rod being cooperable with said seat of the coupling, and means mounted upon said pipe and connected with said valve rod for actuating the latter, said means comprising a cross head connected to the outer end of said valve rod, a plate anchored on the intake end of said pipe, and connections between said cross head and plate.

In testimony whereof I affix my signature.

RICHARD J. BURNS.